United States Patent [19]

Bosco et al.

[11] 4,292,333

[45] Sep. 29, 1981

[54] LOW-FAT, BUTTER-FLAVORED, LIQUID SPREAD AND PROCESS

[75] Inventors: Peter M. Bosco, Brookfield Center; William L. Sledzieski, Norwalk, both of Conn.

[73] Assignee: Standard Brands Incorporated, New York, N.Y.

[21] Appl. No.: 95,645

[22] Filed: Nov. 19, 1979

[51] Int. Cl.$^3$ .............................. A23D 3/00; A23D 5/00
[52] U.S. Cl. ..................................... 426/335; 426/532; 426/602; 426/603; 426/604; 426/804
[58] Field of Search ............... 426/335, 602, 603, 604, 426/532, 804

[56] References Cited

U.S. PATENT DOCUMENTS

| | | | |
|---|---|---|---|
| 3,117,010 | 1/1964 | Geisler | 426/602 |
| 3,223,532 | 12/1965 | Pinkalla et al. | 426/602 |
| 3,437,494 | 4/1969 | Loter et al. | 426/602 |
| 3,533,802 | 10/1970 | Cooper et al. | 426/602 X |
| 3,695,889 | 10/1972 | Ingerson | 426/602 X |
| 4,146,652 | 3/1979 | Kahn et al. | 426/602 X |

Primary Examiner—Robert A. Yoncoskie
Attorney, Agent, or Firm—Richard Kornutik

[57] ABSTRACT

Disclosed are a low-fat, butter-flavored, liquid spread and a process for preparing it. The spread preferably comprises an oil-in-water emulsion having: less than 30% of a dispersed fat, a continuous aqueous phase containing an emulsion stabilizer, and an emulsifier system comprising a lipophilic emulsifier and a hydrophilic emulsifier. The product realistically simulates the flavor, texture, mouthfeel, appearance, and stability of commercial, liquid margarine, yet reduces the caloric density by from 50 to 95%.

19 Claims, 1 Drawing Figure

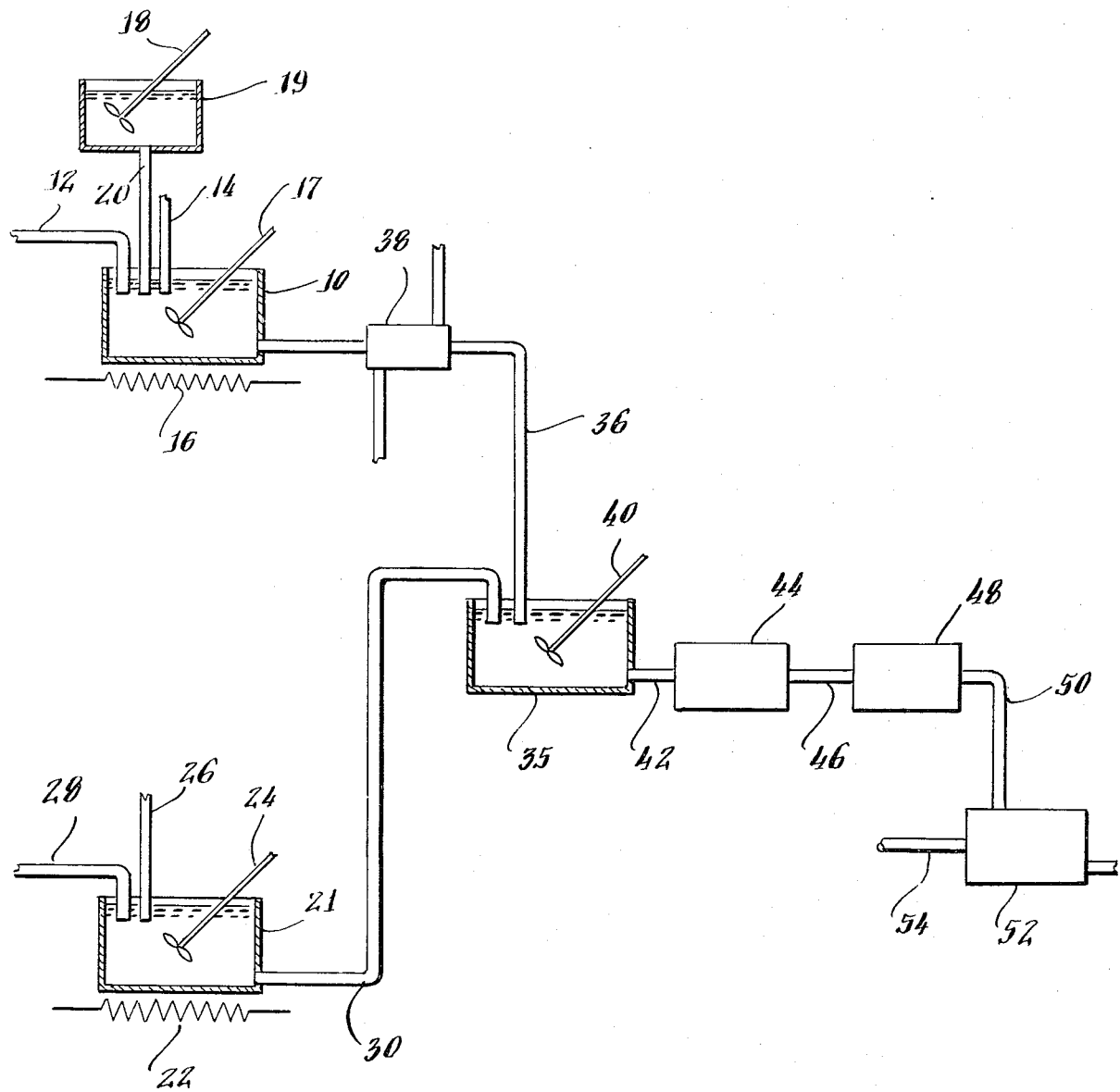

LOW-FAT, BUTTER-FLAVORED, LIQUID SPREAD AND PROCESS

BACKGROUND OF THE INVENTION

The present invention relates to low-fat content, butter-flavored liquid spreads which simulate the flavor, texture, mouthfeel, appearance, and stability of commercial liquid margarine. More particularly, the present invention relates to diet products of this type having a reduction in caloric density of from 50 to 95%, and to a process for preparing them.

In our copending U.S. patent application Ser. No. 095,626, filed concurrently with this application, we describe a low-fat, butter-flavored spread which is solid at serving temperatures. That product, which is based on an oil-in-water emulsion, provides a surprisingly good simulation of butter. An emulsifier system comprising both lipophilic and hydrophilic emulsifiers provides stability and helps provide a solid product. We have now discovered that emulsions very similar to the one disclosed therein can be prepared to form a liquid product.

As in the case of solid low-fat spreads, the prior art patents suggest that liquid products be formed of water-in-oil emulsions. These products can be formed with fat contents as low as 60 or 75%. The problem of obtaining stable water-in-oil emulsions in the liquid state is even more critical than in the solid state. For example, U.S. Pat. No. 3,338,720, to Pichel discloses a process for preparing a liquid spread which is stabilized by a minor proportion of hard fat. This is disadvantageous because hard fat increases viscosity and affects mouthfeel.

Water-in-oil emulsions are known to have an adverse effect on flavor impact. This is so pronounced that it is the problem which was dealt with by Moran in U.S. Pat. No. 4,115,598. Therein, flavor impact for a low-fat spread comprising 35 to 65% by weight of a continuous fat phase and a discontinuous aqueous phase is said to be improved by specially formulating the water-in-oil emulsion to destabilize in the mouth to release the water-soluble flavors.

Further representative of the state of the art of liquid spreads is U.S. Pat. No. 3,796,815 to Lincklaen et al. This patent discloses improving the stability of low-fat spreads of the water-in-oil type by incorporating a specific type of phosphatide in the aqueous phase. However this improvement in stability would seem to adversely affect flavor impact.

In forming solid, lowfat spreads, Josefowicz et al indicate in U.S. Pat. No. 3,457,086 that proteins should be substantially eliminated and that special fats and processing conditions must be employed to obtain emulsion stability. While unstable solid emulsions make certain hot foods, such as toast, soggy and unappetizing, unstable liquid emulsions are wholly unpractical.

Among attempts to provide solid low-fat spreads is the approach described by Nijhoff in U.S. Pat. No. 3,418,133. Therein, edible spreads are described wherein a portion of a fat content is replaced by an aqueous solution of carboxymethyl cellulose. In Example 2, a margarine substitute is described which is prepared from a 50/50 mixture of margarine and aqueous solution. This product presumably has a fat content of about 40% (i.e., one half that of margarine); however, the type of emulsion is not identified and the emulsions do not remain stable at room temperature.

U.S. Pat. No. 3,809,764 to Gabby et al. discloses essentially fat-free products which are characterized as "emulsions" of polyglycerol fatty esters with an aqueous hydrophilic colloid. Among the products, are those which are said to simulate margarine yet contain fat contents of less than 5%. These products, while fairly flavorful and fat mimetic, are significantly different in overall flavor, texture, mouthfeel, and appearance from either margarine or butter.

Richardson, in U.S. Pat. No. 4,156,021, also discloses low-fat compositions said to simulate margarine. Example III of this patent employs about 7% corn oil. The emulsions are said to be of the oil-in-water type but contain high levels of cellulose fiber, which adds its characteristic impact on mouthfeel which is significantly different from that of fat.

Other workers have disclosed stable emulsified products containing oil-in-water emulsions, wherein sugars were employed; however, the necessity for sugar made them sweet and clearly distinct from margarine. Among these is U.S. Pat. No. 3,958,033 to Sims et al. which relates to shelf-stable, clear, liquid emulsions. The sugar was essential in these formulations to supply the desired sweetness, adjust the refractive index of the aqueous phase to improve product clarity, and enhance shelf stability. Similarly, in U.S. Pat. No. 4,146,652, Kahn et al. describe stable oil-in-water emulsions containing high sugar levels to obtain microbiological stability. In U.S. Pat. No. 4,107,343 to Petricca, the sugar was required for sweetness demanded of the whipped products involved. Thus, despite the disclosure by these patents of stable oil-in-water emulsions with fat contents in the 10 to 30% range, and the disclosure by Sims et al. in Example XXII of a maple-flavored spread, and a confectionary butter cream in Example I of Kahn et al., there is no solution afforded the skilled worker in the art seeking a product which can successfully reproduce the flavor, texture, mouthfeel, stability and appearance of liquid margarine at a caloric density of 5–45 calories per 14 gram serving.

SUMMARY OF THE INVENTION

It is an object of the present invention to provide an improved low-fat, butter-flavored, liquid spread and a process for preparing it.

It is another object of the invention to provide a low-fat, butter-flavored, liquid spread and a process for preparing it, wherein the product can include dairy proteins to enhance the flavor and nutrition of the product without adversely affecting emulsion stability.

It is yet another and more specific object of the present invention to provide a low-fat, butter-flavored, liquid spread and a process for preparing it, wherein the spread is based on an oil-in-water emulsion and remains stable for reasonable periods at room and refrigerator temperatures.

It is another specific object of the present invention to provide a low-fat, butter-flavored, liquid spread and a process for preparing it, wherein the spread is based on an oil-in-water emulsion which is liquid and stable at refrigerator temperature for at least six months and is stable at room temperature for at least 24 hours.

It is yet a further specific object of the present invention to provide a low-fat, butter-flavored, liquid spread and a process for preparing it, wherein the emulsion forming the spread remains stable when required during freeze/thaw cycling.

It is another object of the invention to provide a low-fat, butter-flavored, liquid spread and a process for preparing it, wherein the spread otherwise imparts all of the desirable attributes and characteristics of liquid margarine.

It is a further and yet more specific object of the present invention to provide a low-fat, butter-flavored, liquid spread and a process for preparing it, wherein the spread is liquid at refrigerator temperature, and is based on an oil-in-water emulsion which remains stable for at least 24 hours at room temperature and for at least 6 months at refrigerator temperature, yet has a caloric density of less than 50, and preferably about 25, calories per 14 gram serving.

These and other objects are achieved according to the present invention which provides an improved low-fat, butter-flavored, liquid spread and a process for preparing it. The spread, in its broad aspects, comprises: a dispersed phase comprising less than 40% fat, based on the weight of the spread; a continuous aqueous phase including a stabilizer; and an emulsifier system comprising a combination of a lipophilic emulsifier and a hydrophilic emulsifier; the relative and total amounts of the emulsifiers and the stabilizer being effective to provide a stable, liquid emulsion at 40° F.

The process in its broad aspects comprises: admixing the ingredients for the spread as defined above to form an emulsion, and homogenizing the emulsion under conditions effective to form a stable product which is liquid at 40° F.

BRIEF DESCRIPTION OF THE DRAWING

The invention will be better understood and its advantages will become more apparent from the following detailed description, especially when read in light of the following drawing, wherein:

The FIGURE is a flow diagram showing a preferred process scheme according to the invention.

DETAILED DESCRIPTION

The products of the invention, which are prepared by the process of the invention, effectively simulate good quality liquid margarine in flavor, texture, appearance, mouthfeel and stability, yet have caloric densities of less than 50, and preferably less than 35, calories per 14 gram serving compared to about 100 for margarine and butter. The spreads are liquid at refrigerator temperature of about 40° F., and preferably down to about 32° F. They are based on oil-in-water emulsions which remain stable even after standing at a room temperature.

The term "butter-flavored" is meant to include compositions flavored to simulate the flavor of butter by both naturally-derived and simulated butter flavors. This term is used in its literal sense and is not meant to be otherwise restricted. A composition is considered "butter-flavored" when an expert panel trained to evaluate flavors of this type characterizes the product as "buttery" or "butter-like" in flavor.

The term "stable emulsion" identifies those emulsions which do not undergo any noticeable change in stability, due to water or fat separation or otherwise, during storage in moisture-proof containers at a temperature of 40° F. or below for six months and which will also remain stable when stored at a room temperature of 70° for a period of at least 24, and preferably 72, hours. It is also preferred that the emulsions of the present invention remain stable at elevated temperatures of 180° F. or more.

The term "liquid" is used in its normal sense, to mean the product flows under its own weight. Included within the scope of this term are viscous compositions. The preferred products of the invention will exhibit a Brookfield viscosity of less than about 15,000 centipoises, most preferably less than about 8500 centipoises, after shaking for 10 seconds and measuring at 40° F. employing a Brookfield RVT viscometer with a number 3 spindle at 10 rpm.

In distinction with some of the prior art compositions, the products of the present invention can contain proteins if desired for their beneficial effects on flavor, nutrition and mouthfeel, while not adversely affecting emulsion stability.

The ingredients which are essential to the formation of the product are: (1) fat which is suitably selected to have a solids profile which enables the formation of a liquid product at 40° F., (2) a water-soluble emulsion stabilizer, and (3) an effective emulsifier system comprising both lipophilic and hydrophilic emulsifiers.

The fat will preferably be present in amounts within the range of from about 5 to 40 percent based on the weight of the spread, and most preferably in an amount of from 10 to 30 percent of the weight of the spread.

The term "fat" as used herein is intended to include all edible, fatty acid triglycerides regardless of origin or whether they are solid or liquid at room temperature. Thus, the term "fat" includes normally liquid and normally solid vegetable oils and animal fats. Typical of the vegetable oils which are included are the usual vegetable oils such as soybean oil, corn oil, coconut oil, cottonseed oil, peanut oil, safflower oil, palm kernel oil, sunflower oil, palm oil, and rapeseed oil. The preferred fats for use in the invention will comprise unhydrogenated or partially-hydrogenated vegetable oils, and will most preferably be selected from the group consisting of soybean oil, corn oil, coconut oil, cottonseed oil, peanut oil, palm oil, palm kernel oil, safflower oil, sunflower oil, rapeseed oil, and mixtures of these. Preferred among these are those vegetable oils which have an SFI (Solids Fat Index) profile within the following ranges:

| Temp. | Broad | Preferred |
| --- | --- | --- |
| 50° F. | 0 to 35% | 10 to 25% |
| 70° F. | 0 to 25% | 5 to 15% |
| 92° F. | <8% | <4% |

The fat will preferably be selected to provide a liquid product at 40° F. Where necessary to decrease the solids content, an amount of a liquid oil having virtually no solids content at 40° F. can be added.

The use of water-soluble emulsion stabilizers is essential to provide the necessary stability. These can be any of those known to the art for this purpose and will preferably be a hydrophilic colloid, and can be selected from the group consisting of microcrystalline cellulose, carageenin, guar gum, alginate, xanthan gum, soy protein isolate, methyl cellulose, carboxymethyl cellulose, ethyl cellulose, hydroxypropylmethyl cellulose, dextrins, starch, gelatin, locust bean gum, pectin, and the like and mixtures of these.

Commercial stabilizers available from Polak's Frutal Works, Inc. and identified by the manufacturer as Frimulsion Q8 and Frimulsion 10 have been found effective, especially when used in combination. The Q8 product is a blend of modified food starch, locust bean gum, guar gum, gelatin and pectin, and is preferably employed at a weight ratio within the range of from about 1:1 to 3:1 to the Frimulsion 10 which is a blend of locust bean gum and guar gum.

The stabilizer can be employed in any amount effective under the conditions of processing and with the particular ingredients. It has been found, however, that levels of about 0.1 to 3.0 percent, based on the weight of the total composition, are particularly effective. In addition to their emulsion stabilizing function, these materials also have a viscosity-increasing effect on the emulsion. However, this does not cause the emulsions to be unduly viscous or to solidify.

The composition of the invention further comprises an emulsifier system employing both lipophilic and hydrophilic emulsifiers. The relative and total amounts of the emulsifiers are selected to be effective to provide a stable emulsion and a product which is liquid at 40° F. Typical of effective levels will be levels of from 0.1% to 4.0%, based on the total weight of the spread, of the total emulsifier system which employs each of the hydrophilic and lipophilic emulsifiers at levels of at least 0.025%, on the same basis. The lipophilic emulsifier will typically have an HLB (hydrophile-lipophile balance) of less than 7, and the hydrophilic emulsifier will typically have an HLB of from 10 to 20, preferably from 11 to 17.

The emulsifier system is preferably present at a level of from 0.15 to 2.0%, and the lipophilic and hydrophilic emulsifiers are preferably each present at levels of at least 0.05%, all percentages based on the total weight of the spread.

The hydrophilic emulsifier will preferably comprise a member selected from the group consisting of polyoxyethylene (20) sorbitan monostearate, polyoxyethylene (20) sorbitan monooleate, and mixtures of these.

These emulsifiers, commonly known as polysorbate 60, and polysorbate 80, respectively, are preferred in the practice of this invention; however, it is believed that other hydrophilic emulsifiers with an HLB of between 10 and 20, preferably between 11 and 17, and most preferably 13 and 16, will be operable. Among other suitable emulsifiers are salts of fatty acid lactylates such as sodium and calcium stearoyl-2-lactylate; and the polyglycerol esters of fatty acids, such as octaglycerol monooleate. Also suitable are other of the polysorbates, such as polysorbate 65, which is otherwise known as polyoxyethylene (20) sorbitan tristearate. Various factors such as off-flavor, off-color and generally less desirable qualities of these other materials for use in foods make the aforementioned hydrophilic emulsifiers the most desirable choice in the practice of this invention.

Polysorbate 60, polyoxyethylene (20) sorbitan monostearate, is a mixture of stearate and palmitate partial esters of sorbitol and sorbitol anhydrides condensed with approximately 20 moles of ethylene oxide ($C_2H_4O$) for each mole of sorbitol and its mono and dianhydrides. It is a lemon to orange colored, oily liquid or semi-gel having a faint characteristic odor and a warm, somewhat bitter taste. It is soluble in water, aniline, ethyl acetate, and toluene, but is soluble only at low levels in mineral and vegetable oils. Polysorbate 60 is commercially available under the trademarks Tween 60 from ICI-Atlas, Drewpone 60 from PVO International Inc., SVS-18 from Hodag, Inc., Durfax 60 from SCM Corporation, and GYSPS-20 from Glyco, Inc.

Polysorbate 80, polyoxyethylene (20) sorbitan monooleate, is a mixture of oleate partial esters of sorbitol and sorbitol anhydrides condensed with approximately 20 moles of ethylene oxide ($C_2H_4O$) for each mole of sorbitol and its mono- and dianhydrides. It is a yellow to orange colored, oily liquid having a faint, characteristic odor and a warm, somewhat bitter taste. It is very soluble in water, producing an odorless, nearly colorless solution, and is soluble in ethanol, fixed oils, ethyl acetate and toluene. Polysorbate 80 is commercially available under the trademarks Tween 80 from ICI-Atlas, SVO-9 from Hodag, Inc., Drewpone 80 from PVO International Inc., Durfax 80 from SCM Corporation, and GYSPO-20 from Glyco, Inc.

Polysorbate 65, polyoxyethylene (20) sorbitan tristearate, is not as preferred as polysorbate 60 and polysorbate 80, but still provides an acceptable product. It is a mixture of stearate and palmitate partial esters of sorbitol and its anhydrides condensed with approximately 20 moles of ethylene oxide ($C_2H_4O$) for each mole of sorbitol and its mono- and dianhydrides. It is a tan, waxy, solid having a faint, characteristic odor and a waxy, somewhat bitter taste. It is soluble at low levels in mineral and vegetable oils; at higher levels in mineral spirits, acetone, ether, dioxane and methanol; and is discernible in water and carbon tetrachloride. Polysorbate 65 is commercially available under the trademarks Tween 65 from ICI-Atlas, Drewpone 65 from PVO International, Inc., Durfax 65 from SCM Corporation, and GYSPT-20 from Glyco, Inc.

The lipophilic emulsifier of the emulsifier system will preferably comprise a member selected from the group consisting of mixed fatty acid monoglycerides; mixed fatty acid diglycerides; mixtures of fatty acid mono- and diglycerides; lipophilic polyglycerol esters; glycerol esters, such as glyceryl monooleate, glyceryl dioleate, glyceryl monostearate, glyceryl distearate, glyceryl monopalmitate, and glyceryl dipalmitate; lactylated esters such as glyceryl-lacto esters of fatty acids; propylene glycol esters such as propylene glycol monopalmitate, propylene glycol monostearate, and propylene glycol monooleate; sorbitan esters such as sorbitan monostearate, sorbitan trioleate, sorbitan tripalmitate, sorbitan tristearate, and sorbitan sesquioleate; fatty acids or their soaps such as stearic acid, palmitic acid, and oleic acid; and mixtures thereof. Here, as in the case of the hydrophilic emulsifier, there is no known criticality in the use of any particular lipophilic emulsifier. Thus, it is fully intended that other equivalent materials can be employed with satisfactory results. However, those specifically identified above, especially those selected from the group consisting of lipophilic polyglycerol esters, mono- and diglycerides, propylene glycol esters, lactylated esters, and mixtures of these, are preferred from the standpoint of taste and effectiveness.

The preferred products of the invention will be suitably colored and flavored with those materials known to the art for these purposes. Examples of coloring agents are beta carotene, annatto, turmeric, caramel color, paprika and FD & C dyes. Typically, the colors will be dissolved or dispersed in the oil or the water phase to expedite blending. Representative of the flavors and/or flavor enhancers will be sodium chloride, lactones, lipolyzed butter oils and starter distillates; diacetyl, 2-octanone, and other ketones; butyric acid, hexanoic acid, and other free fatty acids; esters of butyric acid; delta-hydroxy acids and their glycerol esters; and mixtures of any of these with other known dairy, buttery, or like flavors or flavor notes. It is an advantage of the invention that flavors have a very pronounced impact as compared to prior art water-in-oil compositions.

In addition to emulsion stability, the products of the invention are preferably stable against microbiological and oxidative deterioration. To control mold and yeast growth, the products desirably contain one or more preservatives such as benzoic acid, sorbic acid, phosphoric acid, lactic acid and the soluble salts of these and other like materials. Preferred as antimicrobials are potassium sorbate, sodium sorbate, potassium benzoate, sodium benzoate and phosphoric acid. The pH of the aqueous phase is desirably maintained at a value below 6.0, and preferably within the range of 5.0 to 5.9, to provide effective microbial control and good flavor with the lowest necessary levels of preservatives. Additional stability against oxidative deterioration at higher temperatures may be obtained by the use of the usual antioxidants, typical among which are normal propyl gallate, the several tocopherols, butylated hydroxyanisole (BHA), butylated hydroxytoluene (BHT), nordihydroguaiaretic acid (NDGA), tertiary-butylhydroquinon (TBHQ), and citric acid.

While the products of the invention do not require proteins to obtain the proper texture or mouthfeel, they are sometimes desired for nutritional reasons as well as their positive contribution to the flavor and physical properties of the product. Additionally protein can enhance freeze/thaw stability. Among the suitable protein materials are any of those known to the art for similar uses in margarine and margarine substituents. These can include those derived from vegetable as well as animal sources. Thus, vegetable protein isolates such as those derived from soy, peanut, cottonseed, alfalfa, pea, and the like; milk-protein-containing materials such as caseinates, nonfat dry milk, whey, casein and delactosed whey; and other proteins, can be employed in desired amounts. One suitable type of protein is that sold under the Melotein trademark by Dairyland, Inc. These products are spray dried blends of milk proteins such as sweet dairy whey and caseinates. Typically, they are added in amounts of up to 10% based on the total weight of the spread. Preferred levels will be from 1 to 8% on this basis.

Also added can be any of the vitamins and minerals desired. Preferred among these are vitamins A and D which are normally associated with a butter or margarine product. If desired, these can be added in amounts approximating those in butter or margarine.

Also where desired, a chelating agent such as ethylenediaminetetraacetic acid (EDTA), its salts, such as calcium disodium EDTA, or the like can be employed to tie up metal ions which may otherwise detrimentally interact with one or more of the ingredients.

All of the above ingredients can be formed into the low-fat, butter-flavored liquid spread of the invention by following the preferred process scheme set out in FIG. 3, or otherwise preparing a stable oil-in-water emulsion comprising the essential ingredients, to form a spread which is liquid at 40° F.

The flow diagram of FIG. 3 shows the separate preparation of fat and aqueous phases prior to blending and emulsifying them. The water and water-soluble ingredients, such as milk protein solids, salt, and preservatives, are added to mixing vessel 10 by lines 12 and 14, respectively. The vessel may be equipped with a suitable heater 16 which can be a electrical resistance heater, a water or steam jacket, or the like. Alternatively, the water from line 12 can be supplied hot. Typically, the water will be heated to a temperature of about 190° F. to assure complete hydration of the water soluble materials added. Agitation is supplied by mixing device 17. Where the stabilizers, which are water soluble, are mixed with the water at this stage in processing, the shear supplied by the mixing must be intense enough to overcome the normal tendency of these materials to clump together and prevent complete hydration and dispersion. It is preferred, however, to predisperse the stabilizers in a portion of the fat phase prior to contact with water. This can be accomplished by blending with mixing device 18 in vessel 19, and then passing to vessel 10 by line 20.

The fat phase is prepared in a separate vessel 21 which can also be equipped with a suitable heating device 22 and mixing device 24. The fat-soluble materials such as the color, flavor, vitamins, and emulsifiers if desired, are added at 26 to the fat which is added at 28. The hydrophilic emulsifier will preferably be added to the water phase instead of the fat phase. Temperatures of from about 110° to 190° F., preferably about 130° to 150° F., are effective to provide good solubility of additives and a suitably low viscosity.

The fat phase can be drawn from mixing vessel 21 by line 30 and then passed to vessel 35 wherein it is mixed with the water phase which is supplied by line 36 and may have been cooled to approximately the same temperature as the fat phase by means of heat exchanger 38. Adequate mixing is provided by device 40 which supplies sufficient shear to begin the emulsification of the fat into the water. At the completion of mixing, an emulsion will have been formed which uniformly disperses the fat into droplets within the aqueous phase; however, the droplets are not broken down finely enough to permit emulsion stability.

The rough emulsion prepared in vessel 35 is then passed via line 42 to homogenizer 44 wherein the final emulsion is formed. Homogenization will typically be accomplished at a pressure of from 100 to 500, and preferably about 250, atmospheres. Any of the typical homogenizers or colloid mills effective for dairy purposes can be employed in this process. Thus, the Manton-Gaulin two-stage homogenizer or the Cherry Burrell two-stage homogenizer can be employed effectively.

From the homogenizer 44, the homogenized emulsion is passed via line 46 to a suitable heat exchanger 48 where it is cooled. The heat exchanger 48 will preferably be of a kind capable of rapidly cooling the emulsion. Typical of the suitable devices are scraped-wall heat exchangers, such as those sold under the Votator trademark. Typically, the heat exchanger coolant will be maintained at a temperature of about −20° F. to cool the emulsion rapidly from about 150° to 160° F. to below about 70° F., and preferably below about 50° F.

The cooled emulsion is then preferably passed from the heat exchanger 48 via line 50 for packaging. The liquid spreads of the present invention are preferably packaged in plastic squeeze bottles, but any suitable package will do. These products are so stable that the emulsions do not separate even after standing for 24 hours or more at room temperature.

The following examples are presented for the purpose of further illustrating and explaining the present invention and are not to be taken as limiting in any regard. Unless otherwise indicated, all parts and percentages will be by weight.

EXAMPLE I

This example describes the preparation of a preferred liquid spread according to the present invention. The spread is made from the following materials which are employed in the amounts listed:

| Ingredient | Amount (parts by wt.) |
|---|---|
| Corn oil[a] | 19.4000 |
| Mono- and diglycerides[b] | 0.5000 |
| Polysorbate 60[c] | 0.1000 |
| Beta carotene (30% in oil) and vitamins | 0.0050 |
| Salt | 1.6500 |
| Butter flavor | 0.0200 |
| Stabilizer[d] | 1.0000 |
| Stabilizer[e] | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

[a]SFI's: 19-23 @ 50° F.; 11-14 @ 70° F.; <3 @ 92° F.
[b]Durem 114
[c]Durfax 60
[d]Frimulsion Q8
[e]Frimulsion 10

An aqueous phase is prepared by heating the water to 190° F. and adding the Frimulsion Q8 and 10 stabilizers predispersed in a portion of the fat phase, and and other dry ingredients to it with agitation. Mixing is continued until the stabilizers are uniformly dispersed and hydrated.

A separate fat phase is prepared by melting the fat and the emulsifiers at a temperature of about 150° F. The color and flavor are then admixed with the melt to obtain a uniform blend.

The aqueous and fat phases are then blended at about 160° F. to provide an emulsion. The emulsion is then homogenized in a Gaulin Laboratory Homogenizer Model 15M set at 250 atmospheres.

The emulsion is then cooled to 50° F. in 10 minutes by slowly agitating with a Hobart Model N50 mixer fitted with a wire whip and a jacketed (water/alcohol coolant at approximately −20°) 5-quart mixing bowl. After cooling, the viscosity is determined by shaking for 10 seconds and then measuring at 40° F. using a Brookfield RVT viscometer fitted with a number 3 spindle, rotated at 10 rpm. The Brookfield viscosity is found to be 5850 centipoises.

EXAMPLE II

This example describes the preparation of another spread according to the present invention. The details of the procedure are the same as in Example I. The only difference is that dairy solids are added and the proportions of the other ingredients are adjusted accordingly.

The spread is made from the following materials which are employed in the amounts listed:

| Ingredient | Amount (parts by wt.) |
|---|---|
| Corn oil[a] | 18.5000 |
| Mono- and diglycerides[b] | 0.5000 |
| Polysorbate 60[c] | 0.1000 |
| Beta carotene (30% in oil) and vitamins | 0.0050 |
| Salt | 1.6500 |
| Butter flavor | 0.0200 |
| Stabilizer[d] | 1.0000 |
| Stabilizer[e] | 0.4000 |
| Water | 74.0743 |
| Potassium sorbate | 0.1300 |
| Sodium benzoate | 0.1000 |
| Phosphoric acid | 0.0150 |
| Calcium disodium EDTA | 0.0057 |
| Dairy solids[f] | 3.5000 |

[a], [b], [c], [d], and [e]: See Example I
[f]Melotein MP-14P by Dairyland, Inc.

The cooled emulsion exhibits a Brookfield viscosity of 9600 centipoises at 40° F., after shaking for 10 seconds and measuring as in Example I.

EXAMPLE III

This example describes the preparation of another spread according to the present invention, but this time containing about 30% fat and employing polysorbate 65 as the hydrophilic emulsifier. The procedure is the same as in Example I. The spread is made from the following materials which are employed in the amounts listed:

| Ingredient | Amount (parts by wt.) |
|---|---|
| Corn oil[a] | 29.4000 |
| Mono- and diglycerides[b] | 0.5000 |
| Polysorbate 65[g] | 1.0000 |
| Beta carotene (30% in oil) and vitamins | 0.0050 |
| Salt | 1.6500 |
| Butter flavor | 0.0200 |
| Stabilizer[d] | 1.0000 |
| Stabilizer[e] | 0.4000 |
| Water | 65.7743 |
| Potassium sorbate | 0.1300 |
| Sodium benzoate | 0.1000 |
| Phosphoric acid | 0.0150 |
| Calcium disodium EDTA | 0.0057 |

[a], [b], [d] and [e]: See Example I
[g]Durfax 65

The cooled emulsion exhibits a Brookfield viscosity of 8700 centipoises at 40° F., after shaking for 10 seconds and measuring as in Example I.

EXAMPLE IV

This example describes the preparation of yet another spread according to the present invention, again employing the procedure of Example I, but this time utilizing only about 5% fat. The spread is made from the following materials which are employed in the amounts listed:

| Ingredient | Amount (parts by wt.) |
|---|---|
| Corn oil[a] | 4.4000 |
| Mono- and diglycerides[b] | 0.5000 |
| Polysorbate 60[c] | 0.1000 |
| Beta carotene (30% in oil) and vitamins | 0.0050 |
| Salt | 1.6500 |
| Butter flavor | 0.0200 |
| Stabilizer[d] | 1.0000 |
| Stabilizer[e] | 0.4000 |
| Water | 91.6743 |
| Potassium sorbate | 0.1300 |
| Sodium benzoate | 0.1000 |
| Phosphoric acid | 0.0150 |
| Calcium disodium EDTA | 0.0057 |

[a], [b], [c], [d] and [e]: See Example I

The cooled emulsion exhibits a Brookfield viscosity of 4050 centipoises at 40° F., after shaking for 10 seconds and measuring as in Example I.

EXAMPLE V

This example describes the preparation of another spread according to the present invention, but this time employing a different emulsifier system. Except for the change in formulation, the process is the same as in Example I. The spread is made from the following materials which are employed in the amounts listed:

| Ingredient | Amount (parts by wt.) |
| --- | --- |
| Corn oil[a] | 19.1000 |
| Glyceryl-lacto esters of fatty acid, lipophilic emulsifier[h] | 0.5000 |
| Octaglycerol monooleate, hydrophilic emulsifier (HLB = 13.0) | 0.4000 |
| Beta carotene (30% in oil) and vitamins | 0.0050 |
| Salt | 1.6500 |
| Butter flavor | 0.0200 |
| Stabilizer[d] | 1.0000 |
| Stabilizer[e] | 0.4000 |
| Water | 76.6743 |
| Potassium sorbate | 0.1300 |
| Sodium benzoate | 0.1000 |
| Phosporic acid | 0.0150 |
| Calcium disodium EDTA | 0.0057 |

[a], [d], and [e]: See Example I
[h]Durlac 100 WK

The emulsion exhibits a Brookfield viscosity of 7000 centipoises at 40° F., after shaking for 10 seconds and measuring as in Example I.

EXAMPLE VI

This example describes the preparation of another liquid spread according to the present invention. The details of the procedure are the same as in Example I. The only difference is that soybean oil is employed in place of the corn oil.

The spread is made form the following materials which are employed in the amounts listed:

| Ingredient | Amount (parts by wt.) |
| --- | --- |
| Soybean oil | 19.4000 |
| Mono- and diglycerides[b] | 0.5000 |
| Polysorbate 60[c] | 0.1000 |
| Beta carotene (30% in oil) and vitamins | 0.0050 |
| Salt | 1.6500 |
| Butter flavor | 0.0200 |
| Stabilizer[d] | 1.0000 |
| Stabilizer[e] | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

[b], [c], [d] and [e]: See Example I.

The above description is for the purpose of teaching the person skilled in the art how to practice the present invention. This description is not intended to detail all of the obvious modifications and variations of the invention which will become apparent upon reading. However, applicants do intend to include all such obvious modifications and variations within the scope of their invention which is defined by the following claims.

What is claimed is:

1. A low-fat, butter-flavored, liquid spread comprising: butter flavor; a dispersed phase comprising from 5 to 40%, based on the weight of the spread of a fat having an SFI profile with the following ranges

50° F.—0–35%
70° F.—0–25%
92° F.—<8%;

a continuous aqueous phase including a stabilizer; and an emulsifier system comprising a combination of a lipophilic emulsifier and a hydrophilic emulsifier, the emulsifier system being present in an amount of from 0.1 to 4.0%, based on the total weight of the spread, and each of the lipophilic and hydrophilic emulsifiers are present at levels of at least 0.025% on the same basis; the relative and total amounts of the emulsifiers and the stabilizer being effective to provide a stable, liquid emulsion at about 40° F.

2. A low-fat, butter-flavored spread according to claim 1 wherein the fat comprises from 10 to 30% of the total weight of the spread.

3. A low-fat, butter-flavored spread according to claim 1 which exhibits a Brookfield viscosity of less than 15,000 centipoises when measured at 40° F., with a number 3 spindle rotated at 10 rpm.

4. A low-fat, butter-flavored spread according to claim 1 wherein the hydrophilic emulsifier comprises a member selected from the group consisting of polyoxyethylene (2) sorbitan monostearate, polyoxyethylene (20) sorbitan monooleate, and mixtures of these.

5. A low-fat, butter-flavored spread according to claim 1 wherein the hydrophilic emulsifier comprises octaglycerol monooleate.

6. A low-fat, butter-flavored spread according to claim 1 wherein the stabilizer comprises from 0.1 to 3.0% of the total weight of the spread.

7. A low-fat, butter-flavored spread according to claim 1 wherein the emulsifier system is present at a level of from 0.15 to 2.0%, and the lipophilic and hydrophilic emulsifiers are each present at levels of at least 0.5%, all percentages based on the total weight of the spread.

8. A low-fat, butter-flavored spread according to claim 7 which is liquid at about 32° F.

9. A process for preparing a low-fat, butter-flavored spread, which comprises: preparing an oil-in-water emulsion by admixing a dispersed phase comprising butter flavor, from 5 to 40%, based on the weight of the emulsion, of a fat having an SFI profile within the following ranges

50° F.—0–35%
70° F.—0–25%
92° F.—<8%, with a continuous aqueous phase, including a stabilizer, and an emulsifier system comprising a combination of lipophilic emulsifier and a hydrophilic emulsifier, the emulsifier system being present in an amount of from 0.1 to 4.0%, based on the total weight of the spread, and each of the lipophilic and hydrophilic emulsifiers being present at levels of at least 0.025% on the same basis, and the relative and total amounts of the emulsifiers and stabilizer being effective to provide a stable emulsion and a product which is liquid at about 40° F.; and homogenizing the emulsion under conditions effective to form a stable product which is liquid at about 40° F.

10. A process according to claim 9 wherein the fat comprises from 10 to 30% of the total weight of the spread.

11. A process according to claim 9 wherein the spread exhibits a Brookfield viscosity of less than 15,000 centipoises when measured at 40° F. with a number 3 spindle rotated at 10 rpm.

12. A process according to claim 9 wherein the hydrophilic emulsifer has an HLB of from 11 to 17 and comprises a member selected from the group consisting of polyoxyethylene (20) sorbitan monostearate, polyoxyethylene (20) sorbitan monooleate, and mixtures of these.

13. A process according to claim 9 wherein the stabilizer comprises from 0.1 to 3.0% based on the total weight of the total composition.

14. A process according to claim 9 wherein the emulsifier system is present at a level of from 0.15 to 2.0%, and the lipophilic and hydrophilic emulsifiers are each present at levels of at least 0.05%, all percentages based on the total weight of the spread.

15. A process according to claim 14 wherein the spread is liquid at about 32° F.

16. A process according to claim 15 wherein the stabilizer comprises from 0.1 to 3.0% of the total weight of the spread.

17. A process according to claim 16 wherein the hydrophilic emulsifier comprises a member selected from the group consisting of polyoxyethylene (20) sorbitan monostearate, polyoxyethylene (20) sorbitan monooleate, and mixtures of these.

18. A process according to claim 17 wherein the composition further comprises effective amounts of antimicrobials to prevent microbiological spoilage of the spread.

19. A process according to claim 16 wherein the hydrophilic emulsifier comprises octaglycerol monooleate.

* * * * *

UNITED STATES PATENT AND TRADEMARK OFFICE
CERTIFICATE OF CORRECTION

PATENT NO. : 4,292,333
DATED : September 29, 1981
INVENTOR(S) : Peter M. Bosco et al.

It is certified that error appears in the above—identified patent and that said Letters Patent is hereby corrected as shown below:

The term of this patent subsequent to June 16, 1998, has been disclaimed.

Signed and Sealed this

Eighth Day of December 1981

[SEAL]

Attest:

Attesting Officer

GERALD J. MOSSINGHOFF

Commissioner of Patents and Trademarks

UNITED STATES PATENT OFFICE
CERTIFICATE OF CORRECTION

PATENT NO. : 4,292,333
DATED : September 29, 1981
INVENTOR(S) : Peter M. Bosco, et al.

It is certified that error appears in the above-identified patent and that said Letters Patent are hereby corrected as shown below:

Column 7, line 30, "substituents" should read -- substitutes --;

line 57, change "FIG. 3" to -- the accompanying figure --;

line 60, change "FIG. 3" to -- the accompanying figure --;

line 66, "a", first occurrence, should read -- an --.

Column 9, line 27, delete "and", second occurrence;

line 43, after "-20°" insert -- F --.

Column 11, line 38, "form" should read -- from --.

Column 12, line 24, "(2)" should read -- (20) --;

line 36, "0.5" should read -- 0.05 --.

Signed and Sealed this

Fourteenth Day of September 1982

[SEAL]

Attest:

GERALD J. MOSSINGHOFF

*Attesting Officer*    *Commissioner of Patents and Trademarks*